(12) United States Patent
Ohkita et al.

(10) Patent No.: US 7,056,999 B1
(45) Date of Patent: Jun. 6, 2006

(54) CYCLOOLEFIN COPOLYMER FORMED BY RING-OPENING POLYMERIZATION, PROCESS FOR PRODUCING THE SAME, AND OPTICAL MATERIAL

(75) Inventors: Kenzo Ohkita, Tokyo (JP); Takashi Imamura, Tokyo (JP); Noboru Oshima, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 10/529,497

(22) PCT Filed: Jun. 19, 2003

(86) PCT No.: PCT/JP03/07805

§ 371 (c)(1),
(2), (4) Date: Mar. 29, 2005

(87) PCT Pub. No.: WO2004/033525

PCT Pub. Date: Apr. 22, 2004

(30) Foreign Application Priority Data

Oct. 8, 2002 (JP) .............................. 2002-294605

(51) Int. Cl.
*C08G 61/06* (2006.01)
(52) U.S. Cl. ...................... 526/281; 526/266; 526/279; 525/326.5; 525/327.2; 525/329.5; 525/338
(58) Field of Classification Search ................ 526/281, 526/279, 266; 525/326.5, 327, 329.5, 338
See application file for complete search history.

(56) References Cited

U.S. PATENT DOCUMENTS

| | | | |
|---|---|---|---|
| 6,403,742 B1 | 6/2002 | Oshima et al. |
| 6,639,021 B1 | 10/2003 | Oshima et al. |
| 6,790,914 B1 | 9/2004 | Kanamori et al. |
| 6,844,403 B1 | 1/2005 | Oshima et al. |
| 6,911,507 B1 | 6/2005 | Ohkita et al. |
| 2005/0107552 A1 | 5/2005 | Oshima et al. |

FOREIGN PATENT DOCUMENTS

| | | |
|---|---|---|
| JP | 1-132626 | 5/1989 |
| JP | 7-196779 | 8/1995 |
| JP | 11-130846 | 5/1999 |

OTHER PUBLICATIONS

U.S. Appl. No. 10/529,497, filed Mar. 29, 2005, Ohkita et al.
U.S. Appl. No. 10/515,189, filed Mar. 23, 2005, Oshima et al.

*Primary Examiner*—Fred Teskin
(74) *Attorney, Agent, or Firm*—Oblon, Spivak, McClelland, Maier & Neustadt, P.C.

(57) ABSTRACT

Disclosed herein are a ring-opened cycloolefin copolymer excellent in optical properties such as transparency, low in water (moisture) absorption property, high in affinity for other materials, good in post processing properties such as adhesive property and printability, and excellent in heat resistance and mechanical strength, a production process thereof, and an optical material.

The ring-opened cycloolefin copolymer of the invention contains a structural unit (A) represented by any one of general formulae (1-1) to (1-3) and a structural unit (B) derived from a specific cycloolefin having an ester group in a proportion of 10:90 to 50:50 in terms of a molar ratio, wherein a monomer for obtaining the structural unit (A) is a tricyclomonoolefin compound containing an endo form in a proportion of at least 80 mol % and has a glass transition temperature of 120 to 250° C.:

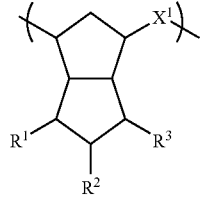

General formula (1-1)

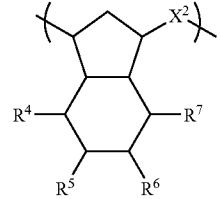

General formula (1-2)

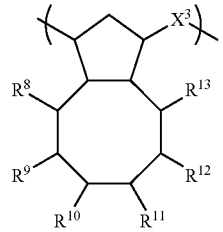

General formula (1-3)

wherein in the general formulae (1-1) to (1-3), $R^1$ to $R^{13}$ individually represent a group selected from a hydrogen atom, halogen atoms, and alkyl groups and halogenated alkyl groups having 1 to 4 carbon atoms, and $X^1$ to $X^3$ mean individually an ethylene group or vinylene group.

8 Claims, 7 Drawing Sheets

CYCLOOLEFIN COPOLYMER FORMED BY RING-OPENING POLYMERIZATION, PROCESS FOR PRODUCING THE SAME, AND OPTICAL MATERIAL

TECHNICAL FIELD

The present invention relates to a ring-opened cycloolefin copolymer and a production process thereof, and an optical material, and particularly relates to a ring-opened cycloolefin copolymer excellent in optical properties such as transparency, high in affinity for other materials, good in post processing properties such as adhesive property and printability, excellent in balance between affinity for other materials and low water (moisture) absorption property and also excellent in heat resistance and mechanical strength and a production process thereof, and an optical material.

BACKGROUND ART

With the demand for weight saving, miniaturization and high-density packaging of electronic apparatus in recent years, replacement of inorganic glass with optically transparent resins is proceeded in fields of optical parts and liquid crystal display parts such as lenses, backlights, light guide plates and liquid crystal substrates, in which the inorganic glass has heretofore been used. Use of transparent resins in the form of sheets, films, thin films or the like is also increasing.

As transparent resins for optical materials, polyacrylates, polycarbonate and the like have heretofore been widely used. However, the transparent resins for replacement of the inorganic glass are required to improve properties such as heat resistance, resistance to moisture absorption, adhesive property and breaking strength in addition to transparency.

In order to meet such requirements, it is begun to use cycloolefin polymers as optical materials.

For example, addition polymers of cycloolefin compounds such as bicyclo[2.2.1]hept-2-ene (norbornene) are proposed as cycloolefin polymers excellent in transparency and heat resistance (see, for example, the following Prior Art. 1, Prior Art. 2, Prior Art. 3 and Prior Art. 4).

However, these cycloolefin addition polymers exhibit a glass transition temperature exceeding 300° C., and so they have very high heat resistance, but involve such problems that thermal molding and forming such as injection molding and extrusion molding become difficult on the other hand.

As polymers of a cycloolefin compound, are known addition copolymers of the cycloolefin compound and an acyclic olefin compound such ethylene (see, for example, the following Prior Art. 5, Prior Art. 6 and Prior Art. 7). As polymerization catalysts for obtaining these cycloolefin addition copolymers, are known catalyst systems containing zirconium, titanium or vanadium, such as metallocene.

Since these catalyst systems scarcely exhibit polymerizing ability to monomers containing polar groups such as an ester group and alkoxysilyl groups, however, it is difficult to impart functions such as adhesive property to the resulting copolymer or introduce crosslinking groups such as a hydrolyzable silyl group. In addition, the cycloolefin addition copolymers may become low in transparency due to crystallinity of an ethylene chain, or the like in some cases and are not always suitable for use as optical materials.

As cycloolefin polymers useful as optical materials for producing lenses, optical disks and the like, ring-opened (co)polymers of a cycloolefin compound or hydrogenated products thereof are proposed (see, for example, the following Prior Art. 8, Prior Art. 9, Prior Art. 10, Prior Art. 11, Prior Art. 12 and Prior Art. 13). These ring-opened cycloolefin (co)polymers or hydrogenated products thereof are excellent in heat resistance, low in water (moisture) absorption property, also excellent in optical properties such as transparency and further excellent in property as to molding such as injection molding. However, such ring-opened cycloolefin (co)polymers or hydrogenated products thereof are low in affinity for other materials because they have no polar group, and involve a problem in properties as to post processing such as adhesion, printing and vapor deposition.

In order to solve such a problem, those with a polar group introduced in their molecules are proposed as ring-opened cycloolefin (co)polymers or hydrogenated products thereof (see, for example, the following Prior Art. 14 and Prior Art. 15). Since these ring-opened cycloolefin (co)polymers or hydrogenated product thereof are excellent in heat resistance and optical properties and also in property as to molding such as injection molding, and moreover excellent in affinity for other materials compared with the ring-opened cycloolefin (co)polymers or hydrogenated products thereof having no polar group, they are also excellent in properties as to post processing such as adhesion. However, such ring-opened cycloolefin (co)polymers or hydrogenated products thereof are low in mechanical strength, so that a problem may arise in some cases when thin molded products such as sheets or films are formed.

On the other hand, dicyclopentadiene (alias: tricyclo[$5.2.1.0^{2,6}$]deca-3,8-diene) is a compound widely used as a starting material in synthesis of a monomer for obtaining the above-described cycloolefin polymers.

When dicyclopentadiene (hereinafter also referred to as "DCP") itself is used as a monomer for obtaining a cycloolefin polymer, however, a gelled product or a polymer having branches may be formed in some cases because DCP has 2 olefinic double bonds in its molecule. Therefore, when DCP is used as a raw material for industrially producing a cycloolefin polymer, there is a problem that it may interfere with the production of the cycloolefin polymer.

In order to solve the problem caused by the presence of a plurality of olefinic double bonds, ring-opened (co)polymers and hydrogenated products thereof obtained by ring-opening (co)polymerization of tricyclo[$5.2.1.0^{2,6}$]dec-3-ene, in which a double bond of a norbornene ring in DCP is hydrogenated, and only a double bond in the 5-membered ring remains are proposed (see, for example, the following Prior Art. 16).

However, such a ring-opened (co)polymer is that obtained through ring-opening the 5-membered ring in tricyclo[$5.2.1.0^{2,6}$]dec-3-ene, and its hydrogenated product contains a chain of 3 methylene groups in the structural unit, so that a problem that only a polymer relatively low in glass transition temperature can be obtained arises.

In DCP, 2 stereoisomers of an exo form and an endo form exist. In both hydrogenated products of their ring-opened polymers, the glass transition temperatures are 97° C. and 66° C., respectively, and are lower than 100° C. It is thus difficult to use them as materials of which heat resistance is required (see, for example, the following Prior Art. 17). Further, polymers that are hydrogenated products of ring-opened (co)polymers, in which a proportion of a structural unit derived from DCP is at least 70% by weight, and a proportion of the endo form in the DCP used is at least 50% by weight, are proposed. According to such hydrogenated products of the ring-opened (co)polymers, it is said that an effect of improving mechanical strength such as impact strength is brought about (see, for example, the following Prior Art. 18). However, the glass transition temperatures of these ring-opened (co)polymers are all lower than 120° C., and so they do not have any performance satisfied as materials of which heat resistance is required.

Prior Art. 1: Japanese Patent Application Laid-Open No. 63807/1992;
Prior Art. 2: Japanese Patent Application Laid-Open No. 198919/1996;
Prior Art. 3: Japanese Patent Application Laid-Open No. 508649/1997 (through PCT route);
Prior Art. 4: Japanese Patent Application Laid-Open No. 505880/1999 (through PCT route);
Prior Art. 5: Japanese Patent Application Laid-Open No. 292601/1986;
Prior Art. 6: U.S. Pat. No. 2,883,372;
Prior Art. 7: Makromol. Chem. Macromol. Symp., Vol. 47, p. 83 (1991);
Prior Art. 8: Japanese Patent Application Laid-Open No. 21878/1988;
Prior Art. 9: Japanese Patent Application Laid-Open No. 138257/1989;
Prior Art. 10: Japanese Patent Application Laid-Open No. 168725/1989;
Prior Art. 11: Japanese Patent Application Laid-Open No. 102221/1990;
Prior Art. 12: Japanese Patent Application Laid-Open No. 133413/1990;
Prior Art. 13: Japanese Patent Application Laid-Open No. 170425/1992;
Prior Art. 14: Japanese Patent Application Laid-Open No. 111200/1975;
Prior Art. 15: Japanese Patent Application Laid-Open No. 132626/1989;
Prior Art. 16: Japanese Patent Application Laid-Open No. 196779/1995;
Prior Art. 17: Polymer J., Vol. 27, No. 12, p. 1167 (1995);
Prior Art. 18: Japanese Patent Application Laid-Open No. 130846/1999.

DISCLOSURE OF THE INVENTION

The present invention has been made on the basis of the foregoing circumstances and has as its first object the provision of a ring-opened cycloolefin copolymer excellent in optical properties such as transparency, high in affinity for other materials, good in post processing properties such as adhesive property and printability, excellent in balance between affinity for other materials and low water (moisture) absorption property and also excellent in heat resistance and mechanical strength.

A second object of the present invention is to provide a process capable of advantageously producing the ring-opened cycloolefin copolymer.

A third object of the present invention is to provide an optical material comprising the ring-opened cycloolefin copolymer.

According to the present invention, there is provided a ring-opened cycloolefin copolymer which is a ring-opened cycloolefin copolymer or hydrogenated ring-opened cycloolefin copolymer comprising a structural unit (A) represented by the following general formula (1-1), the following general formula (1-2) or the following general formula (1-3) and a structural unit (B) represented by the following general formula (2) in a proportion of 10:90 to 70:30 in terms of a molar ratio, wherein a monomer for obtaining the structural unit (A) contains an endo form in a proportion of at least 80 mol % and the copolymer has a glass transition temperature of 120 to 250° C.:

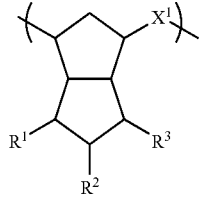

General formula (1-1)

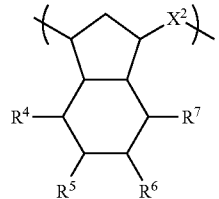

General formula (1-2)

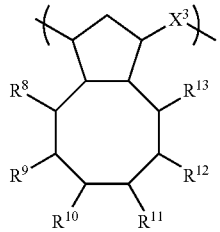

General formula (1-3)

wherein in the general formulae (1-1) to (1-3), $R^1$ to $R^{13}$ independently represent a group selected from a hydrogen atom, halogen atoms, and alkyl groups and halogenated alkyl groups having 1 to 4 carbon atoms, and $X^1$ to $X^3$ mean individually an ethylene group or vinylene group; and

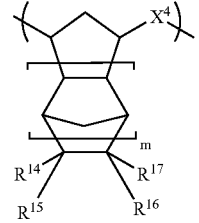

General formula (2)

wherein in the general formula (2), m is 1 or 2, $X^4$ means an ethylene group or vinylene group, and $R^{14}$ to $R^{17}$ independently represent a hydrogen atom, a halogen atom, an alkyl group having 1 to 20 carbon atoms, a cycloalkyl group, an aryl group, an alkenyl group, a halogenated hydrocarbon group, an alkylene group formed by bonding $R^{14}$ or $R^{15}$ to $R^{16}$ or $R^{17}$, a group represented by —$(CH_2)_kZ$ or a group formed by bonding $R^{14}$ or $R^{15}$ to $R^{16}$ or $R^{17}$ and represented by —$(CH_2)_k$—$C(O)O$—, with the proviso that at least one of $R^{14}$ to $R^{17}$ is a group represented by —$(CH_2)_kZ$ or a group represented by —$(CH_2)_k$—$C(O)O$—, in which k is an integer of 0 to 3, Z is a group represented by —$C(O)O$—$R^{18}$ or —$OC(O)$—$R^{19}$, and $R^{18}$ and $R^{19}$ represent individually a hydrocarbon group or halogenated hydrocarbon group having 1 to 10 carbon atoms.

It may be preferable that in the ring-opened cycloolefin copolymer according to the present invention, a monomer for obtaining the structural unit (A) represented by the general formula (1-1), general formula (1-2) or general formula (1-3) is a tricyclomonoolefin compound represented by the following general formula (3-1), the following general formula (3-2) or the following general formula (3-3), and a proportion of an endo form in the tricyclomonoolefin compound is at least 80 mol %:

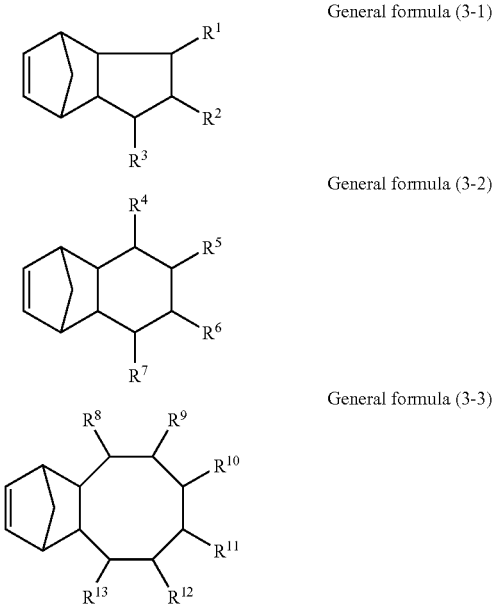

General formula (3-1)

General formula (3-2)

General formula (3-3)

wherein in the general formulae (3-1) to (3-3), $R^1$ to $R^{13}$ independently represent a group selected from a hydrogen atom, halogen atoms, and alkyl groups and halogenated alkyl groups having 1 to 4 carbon atoms.

The ring-opened cycloolefin copolymer according to the present invention may contain a structural unit (C) derived from a cycloolefin compound having a hydrolyzable silyl group or an oxetanyl group in its side chain in a proportion of 0.1 to 30 mol % based on the whole structural unit.

The ring-opened cycloolefin copolymer according to the present invention may be crosslinked by the hydrolyzable silyl group or the oxetanyl group.

In the ring-opened cycloolefin copolymer according to the present invention, at least a part of the structural unit (A) may preferably be a structural unit derived from tricyclo [5.2.1.0$^{2.6}$]dec-8-ene.

According to the present invention, there is provided a process for producing a ring-opened cycloolefin copolymer, which comprises the step of ring-opening polymerization of a monomer composition containing a monomer, which is composed of a tricyclomonoolefin compound represented by the general formula (3-1), the general formula (3-2) or the general formula (3-3), and in which a proportion of an endo form in the tricyclomonoolefin compound is at least 80 mol %, and a monomer represented by the following general formula (4) in a proportion of 10:90 to 70:30 in terms of a molar ratio:

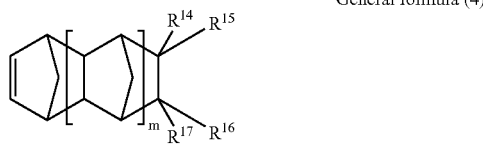

General formula (4)

wherein in the general formula (4), m is 1 or 2, and $R^{14}$ to $R^{17}$ independently represent a hydrogen atom, a halogen atom, an alkyl group having 1 to 20 carbon atoms, a cycloalkyl group, an aryl group, an alkenyl group, a halogenated hydrocarbon group, an alkylene group formed by bonding $R^{14}$ or $R^{15}$ to $R^{16}$ or $R^{17}$, a group represented by —(CH$_2$)$_k$Z or a group formed by bonding $R^{14}$ or $R^{15}$ to $R^{16}$ or $R^{17}$ and represented by —(CH$_2$)$_k$—C(O)O—, with the proviso that at least one of $R^{14}$ to $R^{17}$ is a group represented by —(CH$_2$)$_k$Z or a group represented by —(CH$_2$)$_k$—C(O) O—, in which k is an integer of 0 to 3, Z is a group represented by —C(O)O—$R^{18}$ or —OC(O)—$R^{19}$, and $R^{18}$ and $R^{19}$ represent individually a hydrocarbon group or halogenated hydrocarbon group having 1 to 10 carbon atoms.

In the production process of the ring-opened cycloolefin copolymer according to the present invention, the monomer composition may preferably be hydrogenated after the ring-opening copolymerization treatment.

According to the present invention, there is provided an optical material comprising the ring-opened cycloolefin copolymer described above.

BEST MODE FOR CARRYING OUT THE INVENTION

Figure 1:
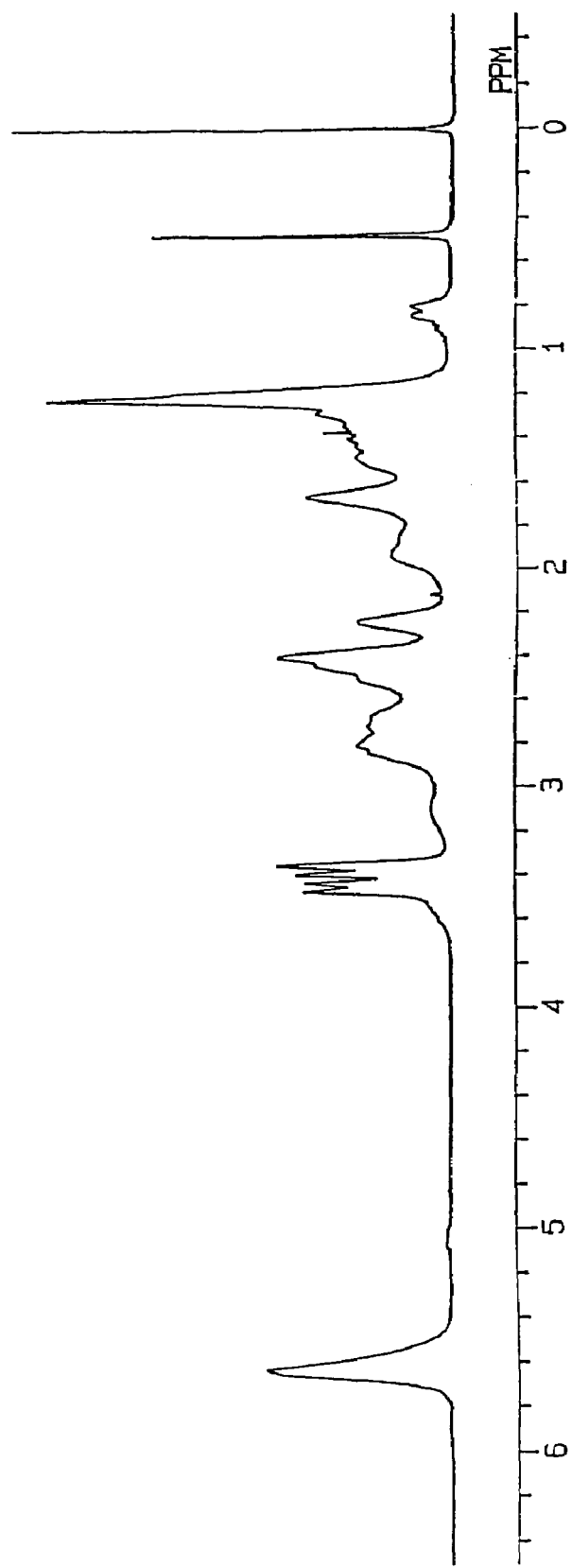
FIG. 1 illustrates a $^1$H-NMR spectrum of Ring-Opened Copolymer A obtained in Example 1.

The embodiments of the present invention will hereinafter be described in details.

The ring-opened cycloolefin copolymer according to the present invention comprises a structural unit (A) (hereinafter also referred to as "structural unit (A)" merely) represented by the general formula (1-1), the general formula (1-2) or the general formula (1-3) and a structural unit (B) (hereinafter also referred to as "structural unit (B)" merely) represented by the general formula (2).

As a monomer for obtaining the structural unit (A) in the ring-opened cycloolefin copolymer according to the present invention, is preferably used a monomer (hereinafter referred to as "specific monomer (A)"), which is composed of a tricyclomonoolefin compound represented by the general formula (3-1), the general formula (3-2) or the general formula (3-3), and in which a proportion of an endo form in the tricyclomonoolefin compound is at least 80 mol %.

As such a specific monomer (A), is used that synthesized by suitably using some publicly known processes. No particular limitation is imposed on the synthetic process thereof. However, a synthetic process by a Diels-Alder reaction of cyclopentadiene (hereinafter also referred to as "CPD") or DCP with a monocyclic monoolefin selected according to the intended specific monomer (A), for example, cyclopentene or cyclohexene is generally utilized.

Such a Diels-Alder reaction is preferably conducted under an atmosphere of an inert gas such as nitrogen or argon. A reaction solvent may not be used unless it is particularly required. The higher the reaction temperature is, the higher the reaction rate becomes. However, selectivity of formation of the endo form is often decreased. From such a point of view, the reaction is generally performed within a range of 150 to 250° C., preferably 170 to 230° C.

CPD or DCP and the monocyclic monoolefin subjected to the reaction may be used in any proportion. However, the monocyclic monoolefin is preferably used in excess by 3 to 50 equivalents to CPD or DCP from the viewpoints of selectivity of formation of the endo form, and the like. A method for adding the raw materials for the reaction may be any of a method that the whole raw material is fed to the reaction system at a time, a method at least one of CPD or DCP and the monocyclic monoolefin is fed to the reaction system in two or more portions, and a method that at least one of CPD or DCP and the monocyclic monoolefin is continuously fed to the reaction system.

The product obtained in such a manner is used as the specific monomer (A) for obtaining the ring-opened cycloolefin copolymer according to the present invention after it is separated and purified by a publicly known method such as distillation.

In the specific monomer (A), it is necessary that a proportion of the endo form is at least 80 mol %. The proportion is preferably at least 90 mol %, more preferably at least 95 mol %. If the proportion of the endo form in the specific monomer (A) is lower than 80 mol %, the resulting hydrogenated ring-opened cycloolefin copolymer becomes insufficient in mechanical strength.

The proportions of the endo form and exo form in the specific monomer (A) can be determined by gas chromatographic analysis.

Specific examples of the specific monomer (A) include tricyclo[5.2.1.0$^{2.6}$]decenes such as
  tricyclo[5.2.1.0$^{2.6}$]dec-8-ene,
  3-methyltricyclo[5.2.1.0$^{2.6}$]dec-8-ene,
  4-methyltricyclo[5.2.1.0$^{2.6}$]dec-8-ene,
  3,4-dimethyltricyclo[5.2.1.0$^{2.6}$]dec-8-ene,
  3,5-dimethyltricyclo[5.2.1.0$^{2.6}$]dec-8-ene,
  3,4,5-trimethyltricyclo[5.2.1.0$^{2.6}$]dec-8-ene,
  3-ethyltricyclo[5.2.1.0$^{2.6}$]dec-8-ene,
  4-ethyltricyclo[5.2.1.0$^{2.6}$]dec-8-ene,
  3,4-diethyltricyclo[5.2.1.0$^{2.6}$]dec-8-ene,
  3,5-diethyltricyclo[5.2.1.0$^{2.6}$]dec-8-ene,
  3-methyl-5-ethyltricyclo[5.2.1.0$^{2.6}$]dec-8-ene,
  3-isopropyltricyclo[5.2.1.0$^{2.6}$]dec-8-ene,
  4-isopropyltricyclo[5.2.1.0$^{2.6}$]dec-8-ene,
  3,4-diisopropyltricyclo[5.2.1.0$^{2.6}$]dec-8-ene,
  3,5-diisopropyltricyclo[5.2.1.0$^{2.6}$]dec-8-ene,
  3-methyl-5-isopropyltricyclo[5.2.1.0$^{2.6}$]dec-8-ene and
  3-chlorotricyclo[5.2.1.0$^{2.6}$]dec-8-ene, tricyclo[6.2.1.0$^{2.7}$]undecenes such as
  tricyclo[6.2.1.0$^{2.7}$]undec-3-ene,
  3-methyltricyclo[6.2.1.0$^{2.7}$]undec-3-ene,
  4-methyltricyclo[6.2.1.0$^{2.7}$]undec-3-ene,
  3,4-dimethyltricyclo[6.2.1.0$^{2.7}$]undec-3-ene,
  3,5-dimethyltricyclo[6.2.1.0$^{2.7}$]undec-3-ene,
  3,4,5,6-tetramethyltricyclo[6.2.1.0$^{2.7}$]undec-3-ene,
  3-ethyltricyclo[6.2.1.0$^{2.7}$]undec-3-ene and
  4-ethyltricyclo[6.2.1.0$^{2.7}$]undec-3-ene, and tricyclo[8.2.1.0$^{2.9}$]tridecenes such as
  tricyclo[8.2.1.0$^{2.9}$]tridec-11-ene,
  3-methyltricyclo[8.2.1.0$^{2.9}$]tridec-11-ene,
  4-methyltricyclo[8.2.1.0$^{2.9}$]tridec-11-ene and
  5-methyltricyclo[8.2.1.0$^{2.9}$]tridec-11-ene.

However, the monomers are not limited thereto.

These compounds may be used as the specific monomer (A) either singly or in any combination thereof.

Among these, tricyclo[5.2.1.0$^{2.6}$]dec-8-ene, tricyclo[6.2.1.0$^{2.7}$]undec-3-ene and tricyclo[8.2.1.0$^{2.9}$]tridec-11-ene are preferred. In particular, tricyclo[5.2.1.0$^{2.6}$]dec-8-ene is preferably used because it is easily available.

As described above, the structural unit (A) in the ring-opened cycloolefin copolymer according to the present invention can be obtained by the process, in which the specific monomer (A) is subjected to ring-opening copolymerization. As another process, the structural unit (A) can also be obtained by, for example, a process, in which a tricyclodiolefin such as tricyclo[5.2.1.0$^{2.8}$]deca-3,8-diene (dicyclopentadiene) is subjected to ring-opening copolymerization, followed by hydrogenation of its cycloolefinic unsaturated bond in a side chain. When such a process is applied, the cycloolefinic unsaturated bond in the side chain may react during the ring-opening polymerization to form a gelled product or a polymer having branches in some cases. Therefore, polymerization conditions are preferably controlled so as not to cause such a side reaction.

In the present invention, a monomer (hereinafter referred to as "specific monomer (B)") represented by the general formula (4) is used as a monomer for obtaining the structural unit (B).

Specific examples of the specific monomer (B) include
  8-methoxycarbonyltetracyclo[4.4.0.1$^{2.5}$.1$^{7.10}$]dodec-3-ene,
  8-methyl-8-methoxycarbonyltetracyclo[4.4.0.1$^{2.5}$.1$^{7.10}$]dodec-3-ene,
  8-methyl-8-ethoxycarbonyltetracyclo[4.4.0.1$^{2.5}$.1$^{7.10}$]dodec-3-ene,
  8-methyl-8-butoxycarbonyltetracyclo[4.4.0.1$^{2.5}$.1$^{7.10}$]dodec-3-ene,
  8-methyl-8-cyclohexyloxycarbonyltetracyclo[4.4.0.1$^{2.5}$.1$^{7.10}$]dodec-3-ene,
  8-trifluoroethyloxycarbonyltetracyclo[4.4.0.1$^{2.5}$.1$^{7.10}$]dodec-3-ene,
  8-acetoxyoxytetracyclo[4.4.0.1$^{2.5}$.1$^{7.10}$]dodec-3-ene,
  8-methyl-8-acetoxyoxytetracyclo[4.4.0.1$^{2.5}$.1$^{7.10}$]dodec-3-ene,
  11-methyl-11-methoxycarbonylhexacyclo-[6.6.1.1$^{3.5}$.0$^{2.7}$.0$^{9.14}$.1$^{10.13}$]heptadec-4-ene and
  11-methoxycarbonylhexacyclo[6.6.1.1$^{3.6}$.0$^{2.7}$.0$^{9.14}$.1$^{10.13}$]-heptadec-4-ene.

However, the monomers are not limited thereto.

These compounds may be used as the specific monomer (B) either singly or in any combination thereof.

Among these, tetracyclododecenes, in which m is 1, are preferred, with 8-methoxycarbonyltetracyclo

[4.4.0.1$^{2,5}$.1$^{7,10}$]dodec-3-ene and 8-methyl-8-methoxycarbonyltetracyclo[4.4.0.1$^{2,5}$.1$^{7,10}$]dodec-3-ene being more preferred.

Proportions of the structural unit (A) and the structural unit (B) in the ring-opened cycloolefin copolymer according to the present invention are such that a molar ratio of the structural unit (A) to the structural unit (B) is 10:90 to 70:30, preferably 20:80 to 65:35. By containing the structural units in such proportions, a ring-opened cycloolefin copolymer, which is good in balance between adhesive property and low water (moisture) absorption, excellent in heat resistance and mechanical strength and suitable for an optical material, is obtained.

If the proportion of the structural unit (A) is too low, the obtained ring-opened cycloolefin copolymer may become low in mechanical strength in some cases. If the proportion of the structural unit (A) is too high on the other hand, the obtained ring-opened cycloolefin copolymer may become low in adhesive property and also low in glass transition temperature to deteriorate its heat resistance in some cases.

In the ring-opened cycloolefin copolymer according to the present invention, the total proportion of the structural unit (A) and the structural unit (B) in the whole structural unit is preferably at least 50 mol %, more preferably at least 70 mol %, still more preferably at least 80 mol %. If the total proportion of the structural unit (A) and the structural unit (B) is lower than 50 mol %, it is difficult to achieve good balance among properties, such as heat resistance, optical properties such as transparency and birefringence, water (moisture) absorption property, and affinity for other materials, so that any of the properties may become unsuitable for practical use in some cases.

In the ring-opened cycloolefin copolymer according to the present invention, a structural unit (C) derived from a cycloolefin compound (hereinafter referred to as "specific monomer (C)") having a hydrolyzable silyl group or an oxetanyl group in its side chain may be contained in addition to the structural unit (A) and the structural unit (B). As examples of the hydrolyzable silyl group, groups represented by the following general formula (5-1) and the following general formula (5-2) can be given:

General formula (5-1)

$$-(C)_n-Si-R^{23}$$
with $R^{20}, R^{22}$ above and $R^{21}, R^{24}$ below

General formula (5-2)

$$-(C)_n-Si\overset{O}{\underset{O}{\diagup\hspace{-0.5em}\diagdown}}Y$$
with $R^{20}$ above, $R^{21}, R^{25}$ below wherein in the general formulae (5-1) and (5-2), R$^{20}$ and R$^{21}$ independently represent a hydrogen atom or a hydrocarbon group having 1 to 20 carbon atoms, R$^{22}$ to R$^{25}$ independently represent a substituent selected from alkyl groups having 1 to 10 carbon atoms, aryl groups, alkoxy groups, allyloxy groups and halogen atoms, n is an integer of 0 to 5, and Y denotes a hydrocarbon residue of an aliphatic diol having 2 to 20 carbon atoms, an alicyclic diol or an aromatic diol.

In the ring-opened cycloolefin copolymer containing such a structural unit (C), the hydrolyzable silyl group or the oxetanyl group in the side chain can be crosslinked by a photo-acid generator, a thermo-acid generator, a compound generating an organic acid or inorganic acid by hydrolysis, a salt of a metal such as tin, aluminum, zirconium or titanium with an organic acid or β-diketone, an alkoxide or phenoxide of such a metal, or the like, whereby a ring-opened cycloolefin copolymer improved in chemical resistance, solvent resistance, heat resistance and mechanical strength can be obtained.

As specific examples of the specific monomer (C), may be mentioned the following compounds. However, the present invention is not limited thereto.

As specific examples of the cycloolefin compound having the hydrolyzable silyl group, may be mentioned
5-trimethoxysilylbicyclo[2.2.1]hept-2-ene,
5-triethoxysilylbicyclo[2.2.1]hept-2-ene,
5-methyldimethoxysilylbicyclo[2.2.1]hept-2-ene,
5-methyldiethoxysilylbicyclo[2.2.1]hept-2-ene,
5-trichlorosilylbicyclo[2.2.1]hept-2-ene,
5-methyldichlorosilylbicyclo[2.2.1]hept-2-ene,
5-[1',4',4'-trimethyl-2',6'-dioxa-1'-silacyclohexyl]bicyclo[2.2.1]hept-2-ene,
8-triethoxysilyltetracyclo[4.4.0.1$^{2,5}$.1$^{7,10}$]dodec-3-ene and
8-methyldiethoxysilyltetracyclo[4.4.0.1$^{2,5}$.1$^{7,10}$]dodec-3-ene.

As specific examples of the cycloolefin compound having the oxetanyl group, may be mentioned
2-[(3-oxetanyl)methoxy]bicyclo[2.2.1]hept-5-ene,
2-[(3-ethyl-3-oxetanyl)methoxy]bicyclo[2.2.1]hept-2-ene,
2-[(3-oxetanyl)methoxymethyl]bicyclo[2.2.1]hept-5-ene,
2-[(3-ethyl-3-oxetanyl)methoxymethyl]bicyclo[2.2.1]hept-2-ene,
8-[(3-ethyl-3-oxetanyl)methoxymethyl]tetracyclo[4.4.0.1$^{2,5}$.1$^{7,10}$]dodec-3-ene,
(3-ethyl-3-oxetanyl)methyl bicyclo[2.2.1]hept-5-ene-2-carboxylate and
(3-ethyl-3-oxetanyl)methyl 2-methylbicyclo[2.2.1]hept-5-ene-2-carboxylate.

These compounds may be used as the specific monomer (C) either singly or in any combination thereof.

When the structural unit (C) is contained in the ring-opened cycloolefin copolymer according to the present invention, the proportion thereof is preferably 0.1 to 30 mol %, more preferably 1 to 20 mol % based on the whole structural unit. If this proportion is lower than 0.1 mol %, crosslinking cannot be fully conducted, and so the resulting ring-opened cycloolefin copolymer becomes insufficient in improvement of solvent resistance, chemical resistance and mechanical strength. If this proportion exceeds 30 mol % on the other hand, the water absorption property of the resulting ring-opened cycloolefin copolymer increases, and moreover the toughness of a molded product thereof may become poor in some cases.

In the ring-opened cycloolefin copolymer according to the present invention, any other structural unit (D) derived from a norbornene compound (hereinafter referred to as "specific monomer (D)") can be contained in a proportion of at most 30 mol % based on the whole structural unit in addition to the structural unit (A) and the structural unit (B), and the structural unit (C) that is introduced as needed.

As specific examples of the specific monomer (D), may be mentioned alkyl-substituted norbornenes such as bicycle[2.2.1]hept-2-ene (norbornene), 5-methylbicyclo[2.2.1]hept-2-ene and 5-hexylbicyclo[2.2.1]hept-2-ene, halogenated alkyl-substituted norbornenes such as 5-trifluoromethylbicyclo[2.2.1]hept-2-ene, aryl-substituted norbornenes such as 5-phenylbicyclo[2.2.1]hept-2-ene, aralkyl-substituted norbornenes such as 5-phenylmethylbicyclo[2.2.1]-hept-2-ene, and tetracyclododecenes such as tetracyclo[4.4.0.1$^{2.5}$.1$^{7.10}$]dodec-3-ene and 8-ethyl-tetracyclo[4.4.0.1$^{2.5}$.1$^{7.10}$]dodec-3-ene. Such a compound is copolymerized, whereby the glass transition temperature and processing properties of the resulting ring-opened cycloolefin copolymer can be controlled, and flexibility can be imparted to the copolymer.

The glass transition temperature of the ring-opened cycloolefin copolymer according to the present invention is 120 to 250° C., preferably 120 to 180° C., more preferably 130 to 170° C. If the glass transition temperature is lower than 120° C., the heat resistance of such a ring-opened cycloolefin copolymer is poor. If the glass transition temperature exceeds 250° C. on the other hand, the processing properties in thermal molding such as injection molding and extrusion molding of such a ring-opened cycloolefin copolymer is deteriorated, and moreover a high molding temperature is required in the thermal molding, so that the ring-opened cycloolefin copolymer is easy to undergo deterioration by heat, and the resulting molded product may becomes brittle or colored. It is hence not preferable that the glass transition temperature is so low or high.

In the ring-opened cycloolefin copolymer according to the present invention, its number average molecular weight (Mn) in terms of standard polystyrene equivalent as measured by gel permeation chromatography at 120° C. is preferably 5,000 to 300,000, more preferably 10,000 to 100,000, particularly preferably 20,000 to 70,000, and its weight average molecular weight (Mw) as measured in the same manner is preferably 20,000 to 700,000, more preferably 40,000 to 400,000, particularly preferably 50,000 to 200,000.

If the number average molecular weight is lower than 5,000, or the weight average molecular weight is lower than 20,000, the breaking strength and elongation of a film, thin film or sheet formed from the ring-opened cycloolefin copolymer become low, and so the formed product often becomes fragile. If the number average molecular weight exceeds 300,000, or the weight average molecular weight exceeds 700,000 on the other hand, such a ring-opened cycloolefin copolymer becomes too high in melt viscosity and solution viscosity to handle in molding processing. It is hence not preferable that the molecular weight is so low or high.

The molecular weight of the ring-opened cycloolefin copolymer can be controlled by controlling the amount of a polymerization catalyst, the amount of a molecular weight modifier, a conversion rate into the copolymer and a polymerization temperature.

The ring-opened cycloolefin copolymer according to the present invention can be produced by subjecting a monomer composition containing the specific monomer (A) and the specific monomer (B), and the specific monomer (C) and/or the specific monomer (D), which are used as needed, to a ring-opening copolymerization treatment, or by subjecting the monomer composition to a ring-opening copolymerization, followed by hydrogenation of the resultant product.

In the present invention, the proportions of the specific monomer (A) and the specific monomer (B) in the monomer composition are such that a molar ration of the specific monomer (A) to the specific monomer (B) is 10:90 to 70:30, preferably 20:80 to 65:35. By containing the specific monomers in such proportions, the ring-opened cycloolefin copolymer achieves good balance between adhesive property or adhesion property and low water (moisture) absorption property, excellent heat resistance and mechanical strength and, the copolymer is suitable for an optical material.

As a polymerization catalyst of the ring-opening copolymerization, single component or multicomponent catalyst is used.

(1) As the unicomponent catalyst, may be used biscyclopentadienyl-3,3-dimethyltitanacyclobutane, biscyclopentadienyl-3-t-butyltitanacyclobutane or a compound represented by

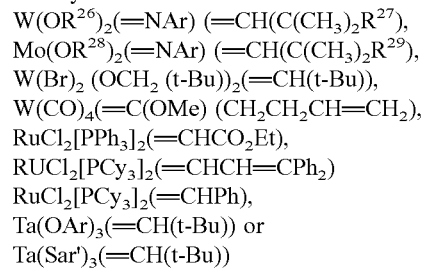

wherein R$^{26}$ to R$^{29}$ individually represent a hydrocarbon group or halogenated hydrocarbon group, and Ar and Ar' mean individually an aromatic substituent group.

(2) As the multicomponent catalyst, may be suitably used a combination of a component (i): at least one selected from compounds of tungsten, molybdenum, rhenium, titanium and hafnium, and a component (ii): at least one selected from compounds of elements of Group IA, IIA, IIB, IIIA, IVA and IVB of the periodic table, said compounds each having an element-carbon bond or an element-hydrogen bond. A component (ii): an additive (activity modifier) may be further combined as needed.

Examples of the compounds of tungsten, molybdenum, rhenium, titanium and hafnium, which are suitable for the component (i), include their halides, oxyhalides, alkoxides, phenoxides, carboxylates, β-diketonates, sulfonates, phosphates, phosphites, carbonyl complexes, acetonitrile complexes, cyclopentadienyl complexes, indenyl complexes, hydride complexes and derivatives thereof. These compounds may be used either singly or in any combination thereof. As the compounds of tungsten and molybdenum, the alkoxides, phenoxides, halides and oxyhalides are particularly preferably used in that they exhibit high polymerization activity.

Specific examples of the compounds used as the component (i) include WCl$_6$, WCl$_5$, WCl$_4$, WBr$_6$, WBr$_4$, WOCl$_4$, WOBr$_4$, W(OC$_6$H$_5$)$_6$, WCl$_4$(OCH$_2$CH$_2$Cl)$_2$, WCl$_2$(OC$_6$H$_5$)$_4$, WOCl$_2$[OC$_6$H$_3$-2,6-(I—Pr)$_2$]$_2$, WO(OC$_6$H$_3$-2,6-Me$_2$)$_4$, MoCl$_5$, MoCl$_3$, Mo(OC$_2$H$_5$)$_5$, MoO$_2$(acac)$_2$, Mo(CO)$_5$(C$_5$H$_5$N), WCl$_6$.(C$_5$H$_5$N), ReOCl$_3$, Re(CO)$_5$Cl, TiCl$_4$, HfCl$_4$, ZrCl$_4$, (η$^5$-C$_5$H$_5$)$_2$—TiCl$_2$ and (η$^5$-C$_9$H$_7$)$_2$TiCl$_2$. These compounds may be used either singly or in any combination thereof.

As specific examples of the compounds used as the component (ii), may be used, organic lithium compounds such as methyllithium, ethyllithium, butyllithium, phenyllithium and cyclopentadienyllithium, organic sodium compounds such as cyclopentadienylsodium, organic magnesium compounds such as dimethylmagnesium, diethylmagnesium, dibutylmagnesium, halogenated ethylmagnesium and halogenated butylmagnesium, organic aluminum compounds such as trialkylaluminum, dialkylaluminum halides, alkylaluminum dihalides, alkylaluminum sesquihalides, dialkylaluminum hydrides and alkylaluminoxane, organic zinc compounds such as dialkylzinc, organic tin compounds such as tetraalkyltin and tetraphenyltin, and metal hydrides such as lithium hydride, lithium aluminum hydride, sodium hydride, sodium boron hydride and aluminum hydride.

The component (ii) is used within a range of preferably 1 to 100 times, more preferably 2 to 30 times of the metal atom of the component (i) in terms of a molar ratio.

The component (iii), the activity modifier, is used as needed for further improving the activity of the ring-opening copolymerization. As specific examples of the component (iii), water, oxygen, acetaldehyde, acetaldehyde diethylacetal, ethylene oxide, eqichlorohydrin, N-nitrosodimethylaniline, tetrabutylammonium chloride, N-nitrosodiphenylamine and aluminum tribromide can be given.

No particular limitation is imposed on the ratio of the component (iii) used, and the ratio is suitably applied according to the selection of the component. It is generally used in a range of 0.005 to 10 times, preferably 0.01 to 2 times in terms of a molar ratio to the component (i).

Examples of a solvent used in the ring-opening copolymerization include aliphatic hydrocarbons such as pentane, n-hexane, n-heptane, butane and 2-methylbutane, alicyclic hydrocarbons such as cyclohexane, cyclopentane and methylcyclopentane, aromatic hydrocarbons such as toluene, benzene, xylene and mesitylene, halogenated hydrocarbons such as dichloromethane, 1,2-dichloroethane, 1,2-dichloroethylene, chlorobenzene and o-dichlorobenzene, and polar solvents such as ethyl acetate, butyl acetate, γ-butyrolactone and nitromethane. These solvents may be used either singly or in any combination thereof. The amount of the solvent used is preferably within a range of 1 to 20 times in terms of a weight ratio to the monomers.

An example of a specific process of the ring-opening copolymerization is described as follows. A reaction vessel is charged, under an atmosphere of nitrogen or argon, with a solvent, a monomer component composed of the specific monomer (A) and the specific monomer (B), which are essential monomers, and optionally the specific monomer (C) and/or the specific monomer (D), and a molecular weight modifier used as needed, and the polymerization system is set to a temperature ranging from −20° C. to 100° C. The polymerization catalyst is then added to the polymerization system to conduct polymerization in a temperature range of −20° C. to 120° C.

In the above process, an α-olefin such as ethylene, propylene, 1-butene, 1-hexene or 1-octene, vinyl ether, thiovinyl ether, vinyl acetate, or the like may be used as the molecular weight modifier.

The amount of the polymerization catalyst added is preferably such that the amount of the monomer component per gram atom of the transition metal atom in the polymerization catalyst amounts to 100–100,000 moles.

The polymerization system may be either a batch system or a continuous system.

Any of the specific monomer (A) or the specific monomer (B) and, the specific monomer (C) or the specific monomer (D), which is used as needed, is fed to the reaction vessel to start the polymerization, and the other monomers are fed stepwise or continuously during the polymerization treatment, whereby a ring-opened cycloolefin copolymer in a state that the proportions of the respective structural units are inclinatorily changed, or in a state that the respective structural units are unevenly distributed in a block form can also be obtained.

The termination of the polymerization reaction is conducted by a compound selected from water, alcohols, organic acids, carbon dioxide, aldehyde compounds and ketone compounds.

After completion of the polymerization reaction, the polymerization reaction mixture may also be subjected to a separation or removal of a polymerization catalyst residue as needed. As a process for such a separation or removal, may be suitably used any publicly known process. An example thereof includes a process, in which an inorganic acid such as hydrochloric acid, nitric acid or sulfuric acid, or an organic acid such as maleic acid or fumaric acid is added to the polymerization reaction mixture, and the resultant mixture is then washed with water of an alcohol solution. The polymerization catalyst residue may also be removed by adsorbing it on an adsorbent such as diatomaceous earth, alumina, silica or activated carbon, or conducting a filtration treatment through a filter.

A polymer solution is solidified with an alcohol such as methanol, ethanol or isopropanol, or another poor solvent, and the solids thus obtained are dried under reduced pressure and/or heating, thereby obtaining the intended ring-opened cycloolefin copolymer. In this step, unreacted monomers remaining in the polymer solution are also removed.

The ring-opened cycloolefin copolymer according to the present invention is not always required to be hydrogenated. The ring-opened cycloolefin copolymer obtained by the above ring-opening polymerization may also be used as it is according to the end application. However, the olefinic unsaturated bonds in its molecule are preferably hydrogenated to control coloring or deterioration by heat, and to achieve excellent thermal stability.

A hydrogenation reaction for hydrogenating the olefinic unsaturated bonds in the molecule may be conducted either by using the copolymer solution after completion of the ring-opening polymerization or by using a copolymer solution prepared by dissolving a ring-opened copolymer in a proper solvent after the removal treatment of the catalyst residue and unreacted monomers.

The hydrogenation reaction is generally conducted under conditions that a hydrogen pressure is 1.0 to 15 MPa, and a temperature is 50 to 200° C. As a hydrogenation catalyst, is suitably used a heterogeneous catalyst with a metal selected from palladium, platinum, platinum, rhodium, iridium ruthenium and nickel carried on a support selected from silica, alumina, zeolite, diatomaceous earth, magnesia, carbon, calcium carbonate and the like, or a homogenous catalyst such as nickel octanoate/triethylaluminum, nickel naphthenate/triethylaluminum, cobalt octanoate/triethylaluminum, cobalt octanoate/n-butyllithium, biscyclopentadienyltitanium dichloride/diethylaluminum chloride, palladium acetate/triethylaluminum, tris(triphenylphosphine)chlororhodium, tris(triphenylphosphine)hydride.carbonyl.chloro.ruthenium, tris(tritolylphosphine)hydride.carbonyl.chloro.ruthenium, tris(trixylylphosphine)hydride.carbonyl.chloro.ruthenium, tris(tricyclohexylphosphine)hydride.carbonyl.chloro.ruthenium, tris(triphenylphosphine)dihydro.carbonyl.ruthenium or bis(triphenylphosphine)dichlororuthenium.

The hydrogenation catalyst is generally used in a range of 10 to 1000 ppm in terms of the transition metal atom to the ring-opened copolymer.

The hydrogenated ring-opened copolymer exhibits excellent thermal stability as the ratio of the hydrogenated olefinic unsaturated bonds in the molecule increases. As a result, deterioration by heat upon heating, deterioration by oxygen can be prevented in a desolvation step, palletizing step, a molding and processing step of a product, or the like.

The ratio of the hydrogenated olefinic unsaturated bonds is generally at least 95%, preferably at least 99%, more preferably at least 99.5%. If the hydrogenation rate is lower than 95%, such a hydrogenated ring-opened copolymer may become insufficient in resistance to deterioration by heat in some cases.

To the ring-opened cycloolefin copolymer according to the present invention, may be added a publicly known antioxidant, for example, a phenolic or hydroquinone antioxidant such as 2, 6-di-t-butyl-4-methylphenol, 4,4'-thiobis (6-t-butyl-3-methylphenol), 1,1'-bis(4-hydroxyphenyl)-cyclohexane, 2,2-methylenebis(4-ethyl-6-t-butylphenol), 2,5-di-t-butylhydroquinone or pentaerythrityl tetrakiss[3-(3,5-di-t-butyl-4-hydroxyphenyl)propionate]. In addition, a phosphorus antioxidant such as tris(4-methoxy-3,5-diphenyl)phosphite, tris(nonylphenyl)phosphite, tris(2,4-di-t-butylphenyl)phosphite, bis(2,6-di-t-butyl-4-methylphenyl) pentaerythritol diphosphite or bis(2,4-di-t-butylphenyl) pentaerythritol diphosphite is incorporated, whereby oxidation stability can be improved.

Among these compounds, those, whose decomposition temperature as measured by 5% weight loss in thermogravimetric analysis is at least 250° C., are preferred. The amount of these antioxidants used is preferably 0.05 to 5.0 parts by weight per 100 parts by weight of the ring-opened cycloolefin copolymer according to the present invention.

In the ring-opened cycloolefin copolymers according to the present invention, the copolymer having the structural unit (C) can be converted to a crosslinked polymer by crosslinking the hydrolyzable silyl group or the oxetanyl group in the structural unit (C).

In the case where the structural unit (C) has the hydrolyzable silyl group, a method for crosslinking such a copolymer can be exemplified by a method crosslinking between the silyl groups by a hydrolysis/condensation reaction caused by acid generated by mixing (a) a compound generating an acid by hydrolysis, or (b) a compound generating a strong Bronsted acid or a Lewis acid by irradiation with active rays, such as ultraviolet lights including g-ray, h-ray or i-ray, far-ultraviolet lights, X-rays, or electron beam, or heat with the copolymer and conducting the appropriate operation.

Specific examples of the compound of (a) include organic phosphite compounds, organic sulfonates, t-butyl carboxylates and hemiacetal carboxylates.

Examples of the compounds of (b) include onium salts such as diazonium salts, ammonium salts, iodonium salts, sulfonium salts, phosphonium salts, arsonium salts and oxonium salts, specific halogenated organic compounds such as halogen-containing oxadiazole compounds, halogen-containing triazine compounds, halogen-containing acetophenone compounds and halogen-containing benzophenone compounds, quinonediazide compounds, α,α-bis (sulfonyl)diazomethane compounds, α-carbonyl-α-sulfonyl-diazomethane compounds, sulfonyl compounds, organic acid ester compounds, organic acid amide compounds, and organic acid imide compounds.

In the case where the structural unit (C) has the oxetanyl group, a method for crosslinking such a copolymer can be exemplified by a method mixing the compound of (b) followed by crosslinking conducted by a ring-opening cationic polymerization reaction of the oxetanyl group caused by the acid generated. As the compound of (b), a compound generating the acid by light is preferably used in that the crosslinking can be conducted at room temperature.

The compound of (a) or the compound of (b) is used in a proportion of 0.05 to 20 parts by weight, preferably 0.2 to 10 parts by weight per 100 parts by weight of the ring-opened cycloolefin copolymer.

The ring-opened cycloolefin copolymer according to the present invention can be formed into a film or sheet by a solution casting process, in which the copolymer is dissolved in an appropriate solvent selected from hydrocarbon solvents or halogenated hydrocarbon solvents to prepare a copolymer solution, followed by casting on a steel belt, a carrier film formed of polyester, or the like, and a drying is then conducted. The copolymer can also be molded into pellets, films, sheets or other shapes by injection molding, compression molding, extrusion by a T-die, or the like.

The ring-opened cycloolefin copolymer according to the present invention is blended with another thermoplastic resin, for example, another cycloolefin (co)polymer (for example, a cycloolefin addition polymer or hydrogenated ring-opened polymer) than the ring-opened cycloolefin copolymer according to the present invention, a petroleum resin having an aromatic ring or alicyclic hydrocarbon structure, or a hydrogenated styrene resin, whereby it can be provided as a resin composition modified in softening temperature, birefringence and/or the like while retaining the transparency.

Since the ring-opened cycloolefin copolymers according to the present invention have excellent optical transparency, heat resistance, adhesive-adhesion property, low water absorption property and mechanical strength, they are extremely useful as optical materials for optical parts such as light guide plates, polarizing films, surface protecting films, light diffusing films, retardation films, transparent conductive films, antireflection films, OHP films, optical disks, optical fibers, lenses and prisms, coatings of the optical parts, etc. In addition, they are useful as electronic part materials such as semiconductor encapsulating materials, coating materials and adhesives, and besides medical instruments, various containers, binders and the like.

The present invention will hereinafter be described specifically by the following Examples. However, the present invention is not limited to these examples. In the following examples, the weight average molecular weight, number average molecular weight, overall light transmittance, glass transition temperature, water absorption, adhesive-adhesion property, tensile strength and elongation were measured or determined in accordance with the following respective methods.

(1) Weight Average Molecular Weight and Number Average Molecular Weight:

The weight average molecular weight and number average molecular weight of a sample in terms of standard polystyrene equivalent was measured by a 150C model gel permeation chromatography (GPC) manufactured by WATERS Co., in which an H type column manufactured by TOSOH CORP. had been installed, using o-dichlorobenzene as a solvent under conditions of 120° C.

(2) Overall Light Transmittance:

A specimen having a thickness of 120 μm was prepared and its total luminous transmittance was measured in accordance with ASTM-D 1003.

(3) Glass Transition Temperature:

The glass transition temperature of a sample was measured at a peak temperature of tan δ(=a ratio E"/E' of a loss modulus E" to a storage modulus E') in dynamic viscoelasticity. The measurement of the dynamic viscoelasticity was conducted by using a RHEOVIBRON DDV-01FP (manufactured by ORIENTEC Co., LTD) under conditions of a measurement frequency of 10 Hz, a heating rate of 4° C./min, an excitation mode of a single waveform and an excitation amplitude of 2.5 μm.

(4) Water Absorption:

After a specimen having a thickness of 120 μm was prepared, and this specimen was immersed for 24 hours in water of 23° C. in accordance with ASTM-D 570, the water absorption was determined by weight change of the specimen.

(5) Adhesive Property:

A specimen of 10 cm×10 cm was prepared, aluminum was vapor-deposited on this specimen, and crosshatched with a cutter blade in a grid pattern at intervals of 1 mm in the deposition layer to form 100 blocks (10×10 blocks) 1 mm×1 mm in size separated from one another, thereby conducting a peel test of the deposition layer with a tape to count the number of blocks peeled among all the blocks (100 blocks).

(6) Tensile Strength and Elongation:

The tensile strength and elongation of a specimen were measured under conditions of a crosshead speed of 3 mm/min in accordance with JIS K 7113.

EXAMPLE 1

A 300-ml glass-made pressure bottle was charged with, under a nitrogen atmosphere, 80 ml of toluene as a solvent, 51 mmol of tricyclo[$5.2.1.0^{2.6}$]-dec-8-ene as a specific monomer (A), in which a molar ratio of an endo form to an exo form was 95:5, 119 mmol of 8-methyl-8-methoxycarbonyltetracyclo[$4.4.0.1^{2.5}.0^{7.10}$]dodec-3-ene as a specific monomer (B) and 42.5 mmol of 1-hexene as a molecular weight modifier, and 0.119 mmol of triethylaluminum and 0.017 mmol of a methanol-modified product of tungsten hexachloride [methanol/tungsten=3 (mol/mol)] were further added in this order as a polymerization catalyst. The specific monomer (A) and specific monomer (B) were subjected to ring-opening polymerization at 80° C. for 2 hours, and the polymerization reaction was then terminated by methanol. The conversion of the monomers into a ring-opened copolymer was 97%.

After 660 ml of water and 47.5 mmol of lactic acid were added to the resultant reaction solution. Then the mixture was stirred, and was arrowed to stand to separate into an aqueous phase and a reaction solution phase. Thereafter, the aqueous phase containing a reaction product of a catalyst component was removed, and the reaction solution was added to 3 liters of isopropanol to solidify and recover a product, thereby removing unreacted monomers. The recovered product was dried at 50° C. for 15 hours under vacuum to obtain a ring-opened cycloolefin copolymer. The thus-obtained ring-opened cycloolefin copolymer is referred to as "Ring-Opened Copolymer A".

Figure 2:
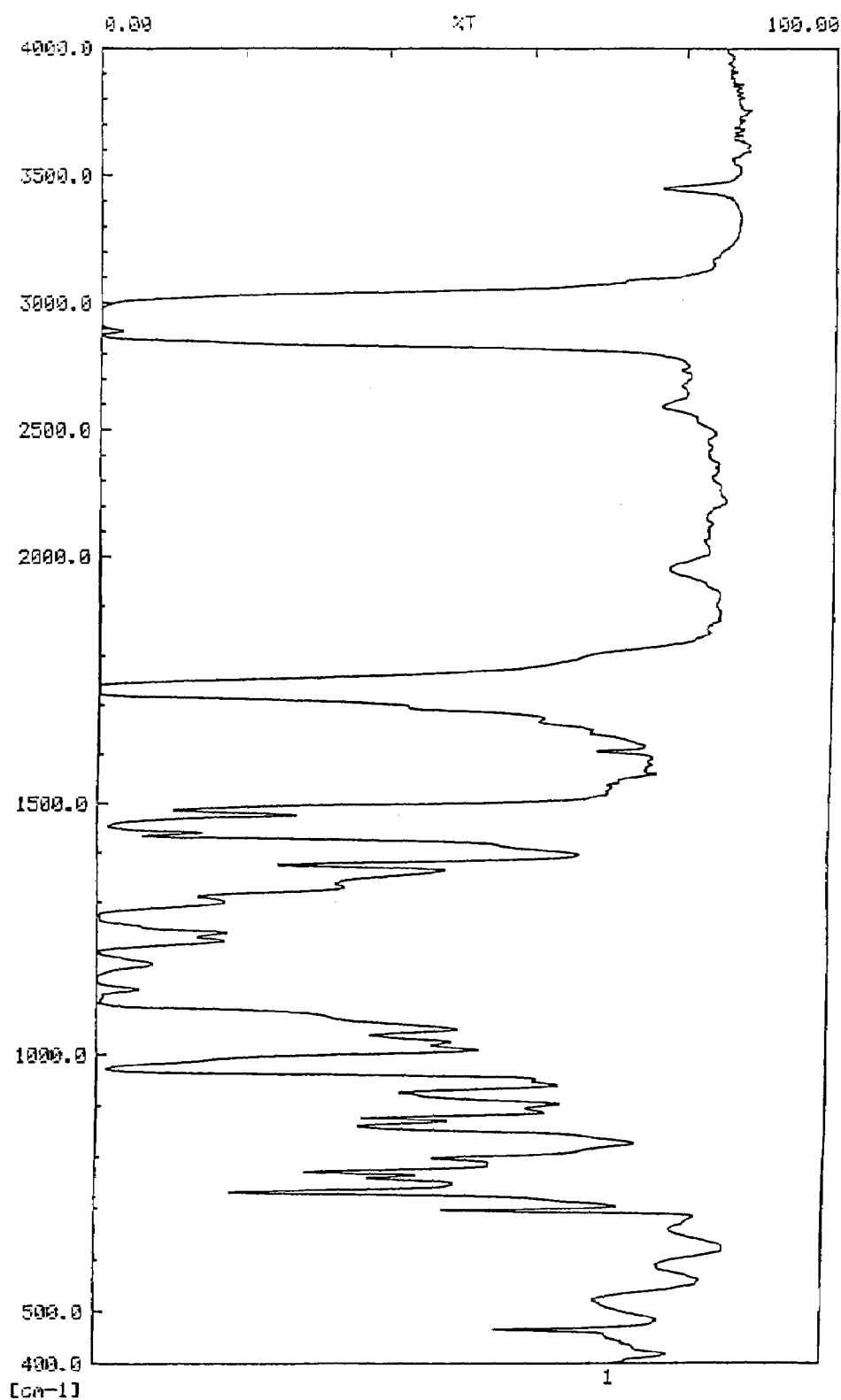
FIG. 2 illustrates an infrared absorption spectrum of Ring-Opened Copolymer A obtained in Example 1.

By a $^1$H-NMR spectrum at 270 MHz of Ring-Opened Copolymer A in benzene-$d_6$, it was determined that a proportion of the structural unit (A) derived from tricyclo [$5.2.1.0^{2.6}$]dec-8-ene is 32 mol % (21.5% by weight), and a proportion of the structural unit (B) derived from 8-methyl-8-methoxycarbonyltetracyclo[$4.4.0.1^{2.5}.0^{7.10}$]dodec-3-ene is 68 mol % (78.5% by weight) (calculated out from a ratio of absorption at 3.2–3.6 ppm based on a methoxycarbonyl group to absorption at 5.4–5.8 ppm based on hydrogen adjacent to a double bond). The $^1$H-NMR spectrum of Ring-Opened Copolymer A is illustrated in FIG. 1, and its infrared absorption spectrum is illustrated in FIG. 2.

A solution with 15 g of the resultant Ring-Opened Copolymer A dissolved in 200 g of toluene and carbonylchlorohydride-tris(triphenylphosphine)ruthenium [RuHCl (CO) (PPh$_3$)$_3$] in an amount of 70 ppm in terms of a ruthenium atom were added into a 500-ml stainless steel-made pressure reaction vessel to conduct a hydrogenation reaction under conditions of a hydrogen pressure of 10 MPa, 165° C. and 4 hours. The resultant reaction solution was subjected to a catalyst-removing treatment with an aqueous solution of lactic acid and then solidified with isopropyl alcohol to obtain a hydrogenated ring-opened cycloolefin copolymer. The thus-obtained hydrogenated ring-opened cycloolefin copolymer is referred to as "Ring-Opened Copolymer AH".

Figure 3:
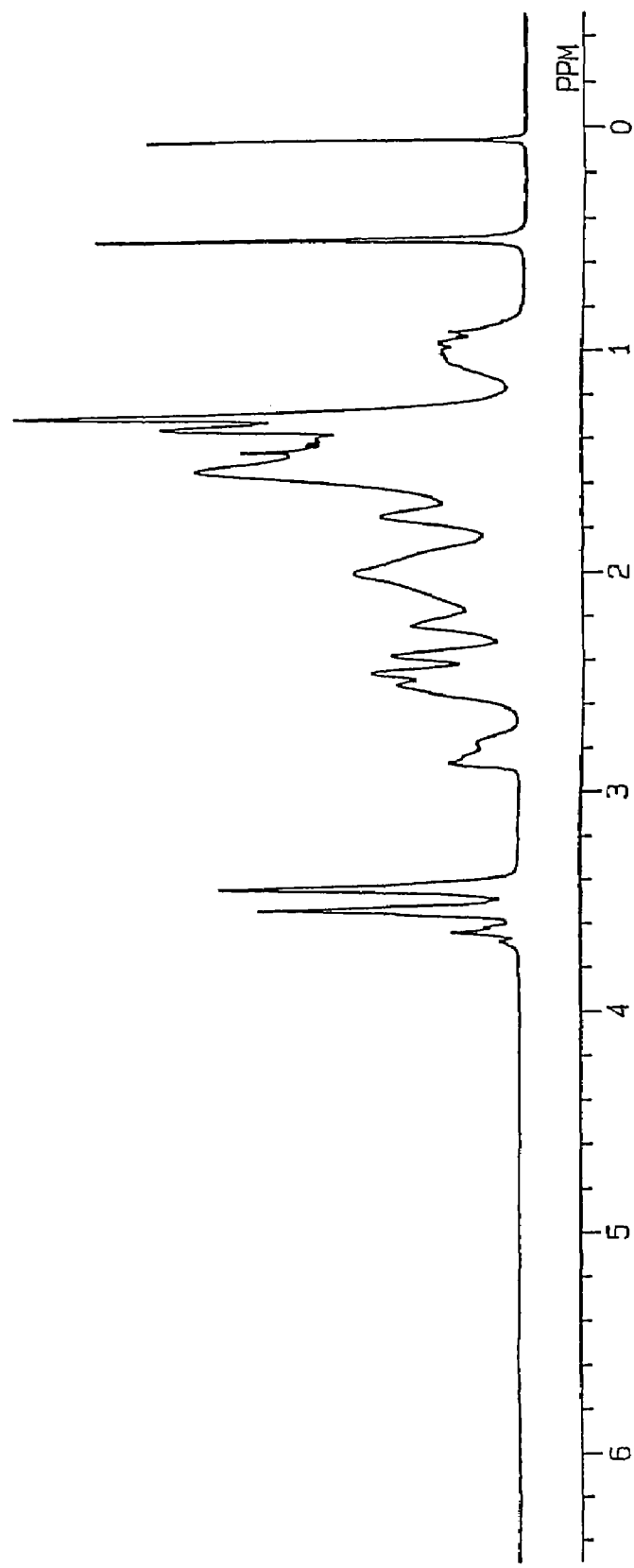
FIG. 3 illustrates a $^1$H-NMR spectrum of Ring-Opened Copolymer AH obtained in Example 1.
Figure 4:
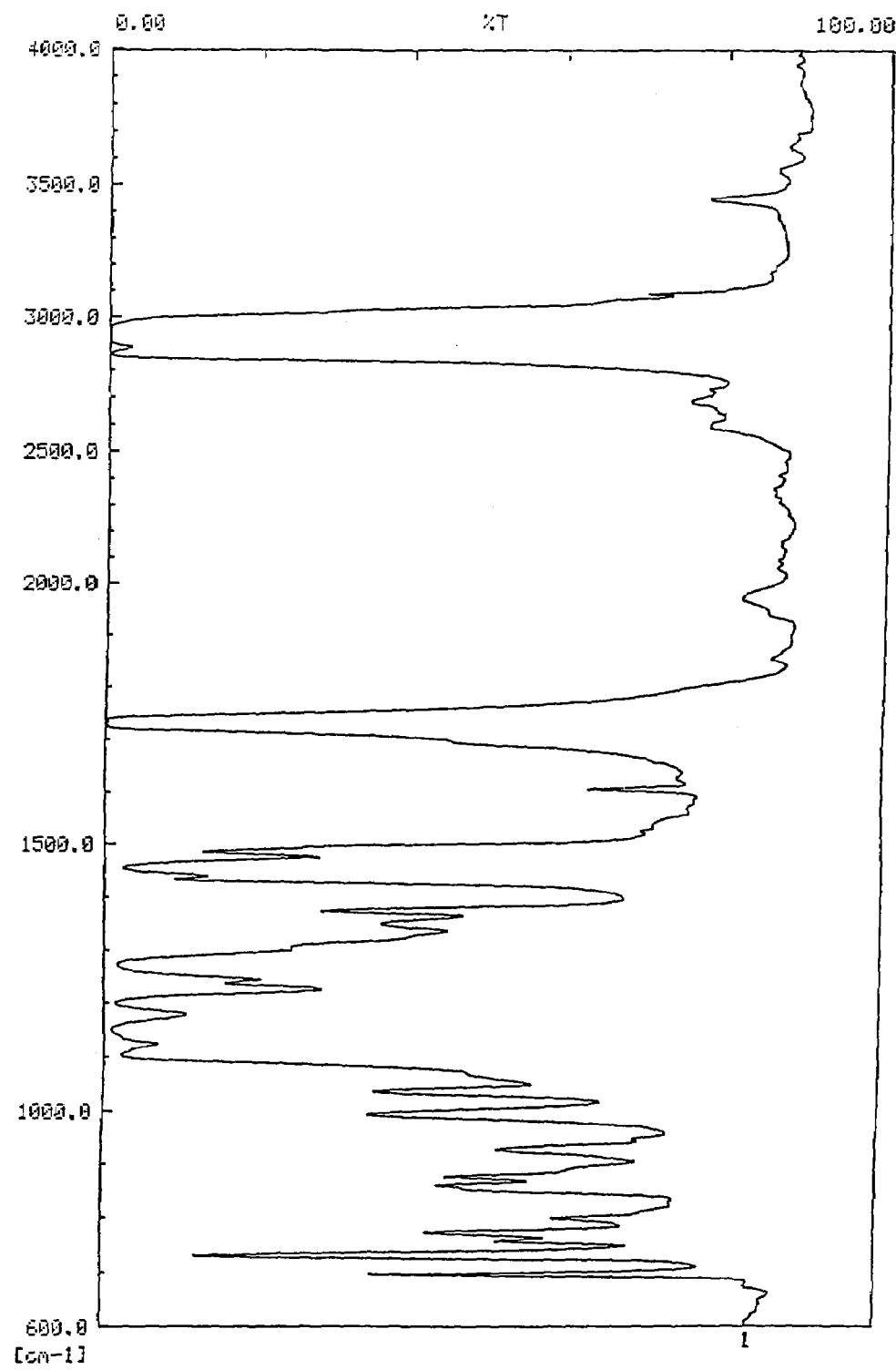
FIG. 4 illustrates an infrared absorption spectrum of Ring-Opened Copolymer AH obtained in Example 1.

A $^1$H-NMR spectrum of this Ring-Opened Copolymer AH was measured to determine a hydrogenation ratio from a relative ratio of absorption at 3.2–3.6 ppm based on a methoxycarbonyl group to absorption at 5.4–5.8 ppm based on hydrogen adjacent to a double bond remaining without being hydrogenated in Ring-Opened Copolymer AH. As a result, it was 99.7%. The $^1$H-NMR spectrum of Ring-Opened Copolymer AH is illustrated in FIG. 3, and its infrared absorption spectrum is illustrated in FIG. 4. The number average molecular weight (Mn) and weight average molecular weight (Mw) of Ring-Opened Copolymer AH in terms of polystyrene were 20,000 and 75,000, respectively, and Mw/Mn was 3.7.

Ten grams of Ring-Opened Copolymer AH were dissolved in 35.5 g of tetrahydrofuran, and pentaerythrityl tetrakiss[3-(3,5-di-t-butyl-4-hydroxyphenyl)propionate] and tris(2,4-di-t-butylphenyl)phosphite were added to the resultant copolymer solution as an antioxidant in respective proportions of 0.5 parts by weight per 100 parts by weight of Ring-Opened Copolymer AH. This copolymer solution was used to form a film having a thickness of 120 μm in accordance with the solution casting process. The solvent remaining in the film thus obtained was 0.5% by weight. A specimen was produced from this film to evaluate it as to the respective physical properties. The results are shown in Table 1.

EXAMPLE 2

Figure 5:
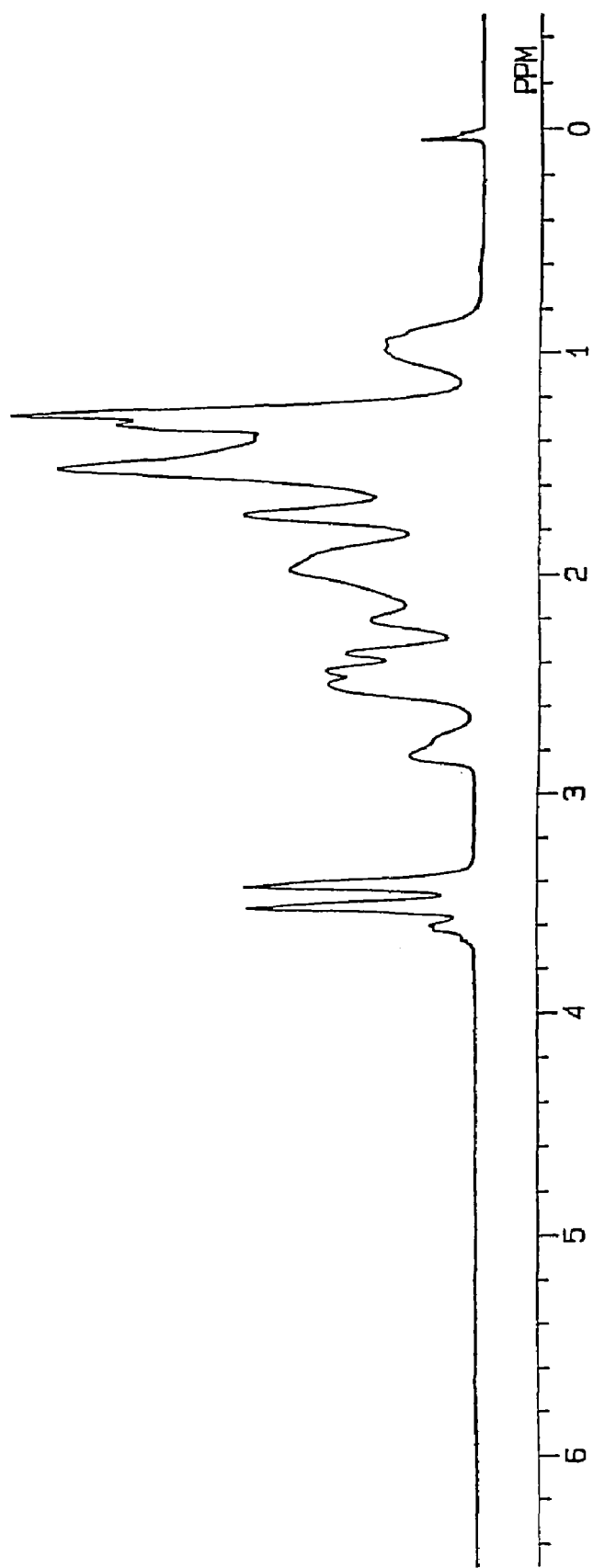
FIG. 5 illustrates a $^1$H-NMR spectrum of Ring-Opened Copolymer BH obtained in Example 2.

A ring-opened cycloolefin copolymer (the resultant ring-opened cycloolefin copolymer is referred to as "Ring-Opened Copolymer B") and a hydrogenated ring-opened cycloolefin copolymer (the resultant hydrogenated ring-opened cycloolefin copolymer is referred to as "Ring-Opened Copolymer BH") were prepared in the same manner as in Example 1 except that 75 mmol of tricyclo[$5.2.1.0^{2.6}$] dec-8-ene as a specific monomer (A), in which a molar ratio of an endo form to an exo form was 95:5, and 95 mmol of 8-methyl-8-methoxycarbonyltetracyclo[$4.4.0.1^{2.5}.1^{7.10}$] dodec-3-ene as a specific monomer (B) were used. The conversion of the monomers into the ring-opened copolymer was 90%, and the hydrogenation ratio of Ring-Opened Copolymer BH was 99.8%. The $^1$H-NMR spectrum of Ring-Opened Copolymer BH is illustrated in FIG. 5.

A proportion of the structural unit derived from tricyclo [$5.2.1.0^{2.6}$]dec-8-ene in Ring-Opened Copolymer B was 45 mol % (32.3% by weight), and a proportion of the structural unit derived from 8-methyl-8-methoxycarbonyltetracyclo [$4.4.0.1^{2.5}.1^{7.10}$]dodec-3-ene was 55 mol % (67.7% by weight).

The number average molecular weight (Mn) and weight average molecular weight (Mw) of Ring-Opened Copolymer BH were 73,000 and 168,000, respectively, and Mw/Mn was 2.3.

With respect to Ring-Opened Copolymer BH, a specimen was made in the same manner as in Example 1 to evaluate it as to the respective physical properties. The results are shown in Table 1.

EXAMPLE 3

A ring-opened cycloolefin copolymer (the resultant ring-opened cycloolefin copolymer is referred to as "Ring-Opened Copolymer C") and a hydrogenated ring-opened cycloolefin copolymer (the resultant hydrogenated ring-opened cycloolefin copolymer is referred to as "Ring-Opened Copolymer CH") were prepared in the same manner as in Example 1 except that tricyclo[5.2.1.0$^{2.5}$]dec-8-ene, in which a molar ratio of an endo form to an exo form was 99:1, was used as a specific monomer (A). The conversion of the monomers into the ring-opened copolymer was 94%, and the hydrogenation rate of Ring-Opened Copolymer CH was 99.7%.

A proportion of the structural unit derived from tricyclo[5.2.1.0$^{2.6}$]dec-8-ene in Ring-Opened Copolymer C was 32 mol % (21.5% by weight), and a proportion of the structural unit derived from 8-methyl-8-methoxycarbonyltetracyclo[4.4.0.1$^{2.5}$.1$^{7.10}$]dodec-3-ene was 68 mol % (78.5% by weight).

The number average molecular weight (Mn) and weight average molecular weight (Mw) of Ring-Opened Copolymer CH were 74,000 and 151,000, respectively, and Mw/Mn was 2.0.

With respect to Ring-Opened Copolymer CH, a specimen was produced in the same manner as in Example 1 to evaluate it as to the respective physical properties. The results are shown in Table 1.

EXAMPLE 4

Figure 6:
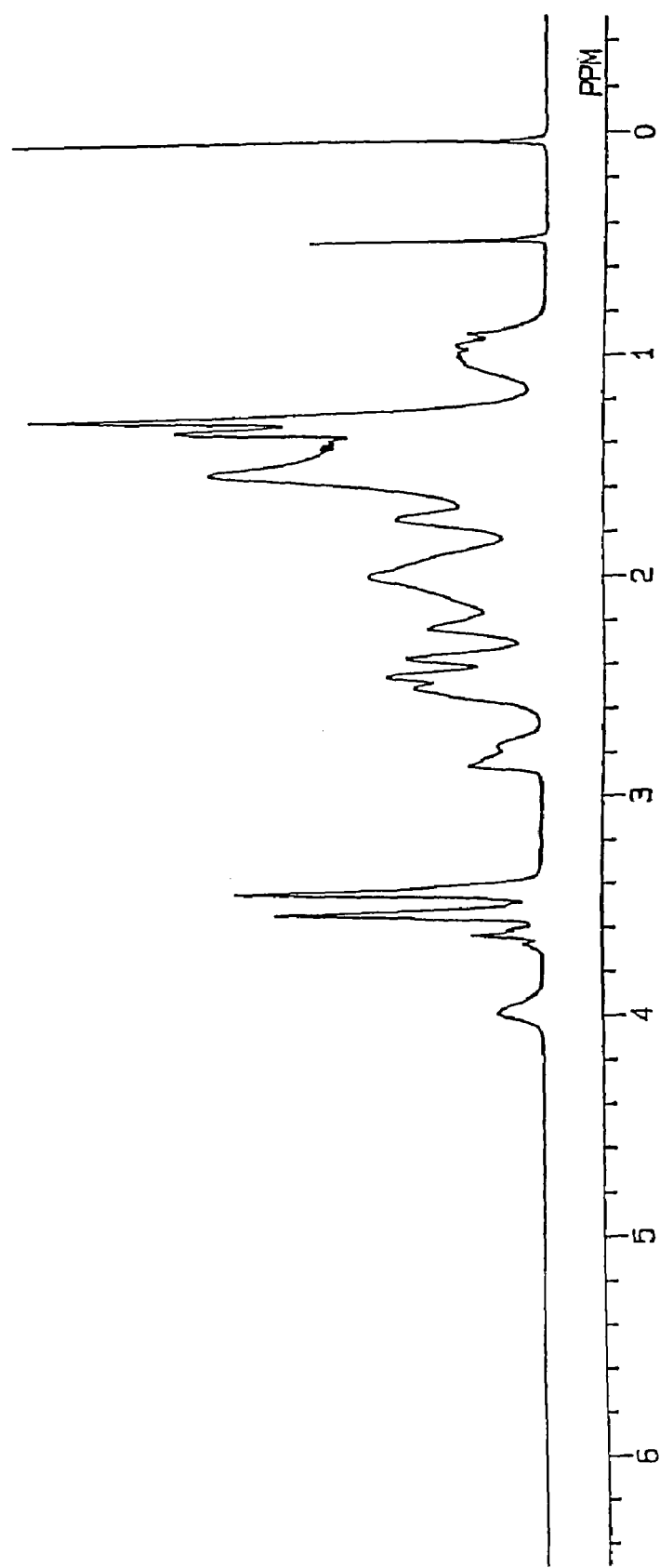
FIG. 6 illustrates a $^1$H-NMR spectrum of Ring-Opened Copolymer DH obtained in Example 4.

A ring-opened cycloolefin copolymer (the resultant ring-opened cycloolefin copolymer is referred to as "Ring-Opened Copolymer D") and a hydrogenated ring-opened cycloolefin copolymer (the resultant hydrogenated ring-opened cycloolefin copolymer is referred to as "Ring-Opened Copolymer DH") were prepared in the same manner as in Example 1 except that 45 mmol of tricyclo[5.2.1.0$^{2.6}$]dec-8-ene as a specific monomer (A), in which a molar ratio of an endo form to an exo form was 99:1, and 100.5 mmol of 8-methyl-8-methoxycarbonyltetracyclo[4.4.0.1$^{2.5}$.1$^{7.10}$]dodec-3-ene as a specific monomer (B) were used, 5 mmol of 5-triethoxysilylbicyclo[2.2.1]hept-2-ene as a specific monomer (C) was used, and the temperature in the hydrogenation reaction was changed to 125° C. The conversion of the monomers into the ring-opened copolymer was 93%, and the hydrogenation ratio of Ring-Opened Copolymer DH was 99.7%. The $^1$H-NMR spectrum of Ring-Opened Copolymer DH is illustrated in FIG. 6.

A proportion of the structural unit derived from tricyclo[5.2.1.0$^{2.6}$]dec-8-ene in Ring-Opened Copolymer D was 32 mol % (21.3% by weight), a proportion of the structural unit derived from 8-methyl-8-methoxycarbonyltetracyclo[4.4.0.1$^{2.5}$.1$^{7.10}$]dodec-3-ene was 65 mol % (74.9% by weight), and a proportion of the structural unit derived from 5-triethoxysilylbicyclo[2.2.1]hept-2-ene was 3 mol % (3.8% by weight).

The number average molecular weight (Mn) and weight average molecular weight (Mw) of Ring-Opened Copolymer DH were 69,000 and 162,000, respectively, and Mw/Mn was 2.3.

Ten grams of Ring-Opened Copolymer DH were dissolved in 35.5 g of tetrahydrofuran, and pentaerythrityl tetrakiss[3-(3,5-di-t-butyl-4-hydroxyphenyl)propionate] and tris(2,4-di-t-butylphenyl)phosphite were added to the resultant copolymer solution as an antioxidant in respective proportions of 0.5 parts by weight per 100 parts by weight of Ring-Opened Copolymer DH. Dibutyl phosphite as a crosslinking agent was additionally added in a proportion of 0.7 parts by weight per 100 parts by weight of Ring-Opened Copolymer DH. This copolymer solution was used to form a film having a thickness of 120 μm in accordance with solution casting process. Steam at 120° C. was introduced into contact with this film for 2 hours to crosslink. A specimen was produced from the crosslinked film to evaluate its respective physical properties. The results are shown in Table 1.

The specimen produced from the crosslinked film was immersed in tetrahydrofuran, toluene and methylene chloride, which are good solvents for Ring-Opened Copolymer DH. As a result, it was confirmed that the specimen was insoluble in these solvents, and the solvent resistance was improved by the crosslinking.

EXAMPLE 5

Figure 7:
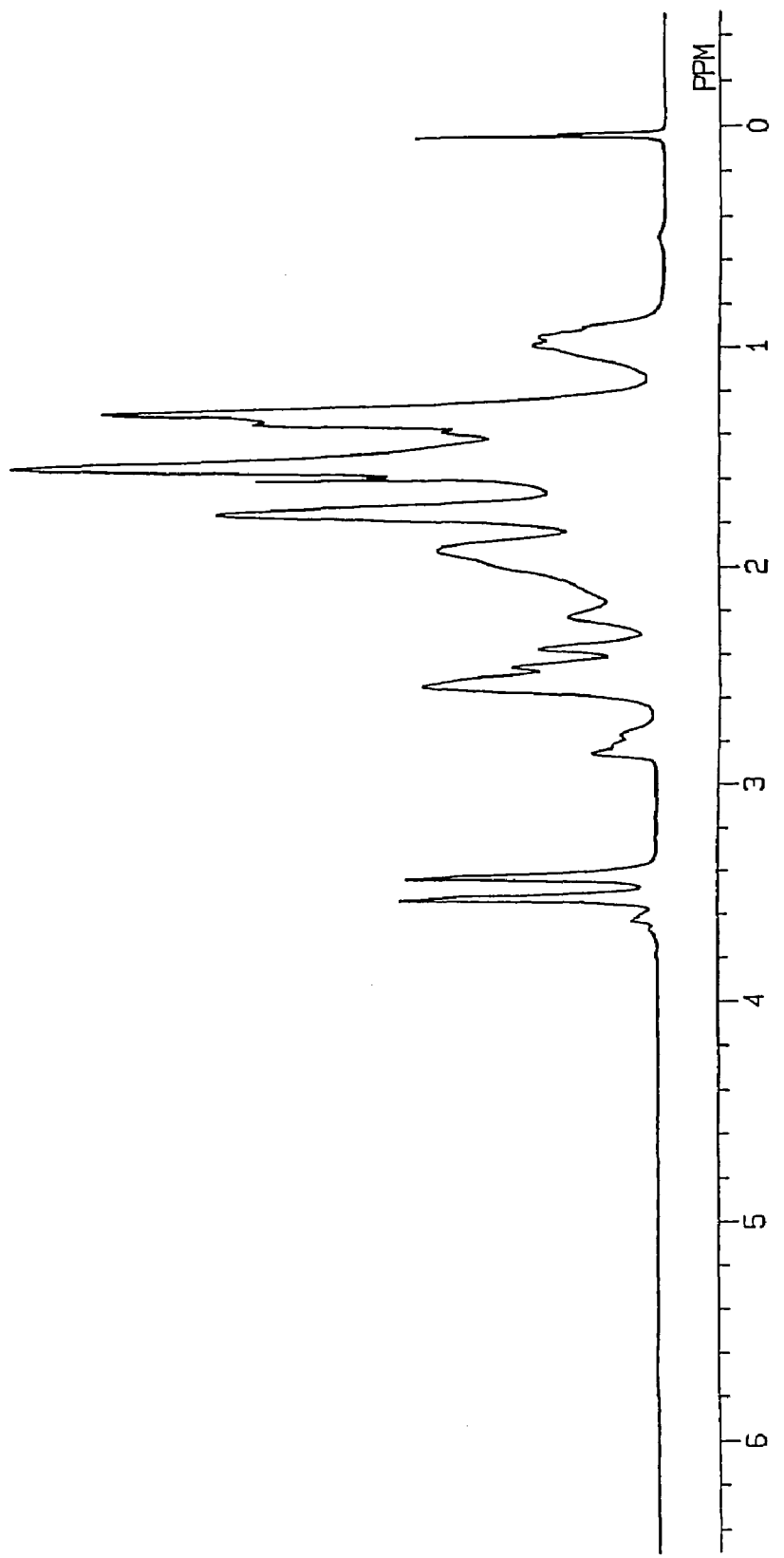
FIG. 7 illustrates a $^1$H-NMR spectrum of Ring-Opened Copolymer EH obtained in Example 5.

A ring-opened cycloolefin copolymer (the resultant ring-opened cycloolefin copolymer is referred to as "Ring-Opened Copolymer E") and a hydrogenated ring-opened cycloolefin copolymer (the resultant hydrogenated ring-opened cycloolefin copolymer is referred to as "Ring-Opened Copolymer EH") were prepared in the same manner as in Example 1 except that 105 mmol of tricyclo[5.2.1.0$^{2.6}$]dec-8-ene as a specific monomer (A), in which a molar ratio of an endo form to an exo form was 95:5, and 65 mmol of 8-methyl-8-methoxycarbonyltetracyclo[4.4.0.1$^{2.5}$.1$^{7.10}$]dodec-3-ene as a specific monomer (B) were used. The conversion of the monomers into the ring-opened copolymer was 88%, and the hydrogenation ratio of Ring-Opened Copolymer EH was 99.8%. The $^1$H-NMR spectrum of Ring-Opened Copolymer EH is illustrated in FIG. 7.

A proportion of the structural unit derived from tricyclo[5.2.1.0$^{2.6}$]dec-8-ene in Ring-Opened Copolymer E was 62 mol % (48.5% by weight), and a proportion of the structural unit derived from 8-methyl-8-methoxycarbonyltetracyclo[4.4.0.1$^{2.5}$.1$^{7.10}$]dodec-3-ene was 38 mol % (51.5% by weight).

The number average molecular weight (Mn) and weight average molecular weight (Mw) of Ring-Opened Copolymer EH were 69,000 and 158,000, respectively, and Mw/Mn was 2.3.

With respect to Ring-Opened Copolymer EH, a specimen was produced in the same manner as in Example 1 to evaluate it as to the respective physical properties. The results are shown in Table 1.

COMPARATIVE EXAMPLE 1

A ring-opened cycloolefin copolymer (the resultant ring-opened cycloolefin copolymer is referred to as "Ring-Opened Copolymer F") and a hydrogenated ring-opened cycloolefin copolymer (the resultant hydrogenated ring-opened cycloolefin copolymer is referred to as "Ring-Opened Copolymer FH") were prepared in the same manner as in Example 1 except that 170 mmol of 8-methyl-8-methoxycarbonyltetracyclo[4.4.0.1$^{2.5}$.1$^{7.10}$]dodec-3-ene alone was used as a monomer subjected to the Ring-Opened polymerization. The conversion of the monomers into the ring-opened copolymer was 100%, and the hydrogenation ratio of Ring-Opened Copolymer FH was 99.8%.

The number average molecular weight (Mn) and weight average molecular weight (Mw) of Ring-Opened Copolymer FH were 20,000 and 73,000, respectively, and Mw/Mn was 3.7.

With respect to Ring-Opened Copolymer FH, a specimen was produced in the same manner as in Example 1 to evaluate its respective physical properties. The results are shown in Table 1.

8-methoxycarbonyltetracyclo[4.4.0.1$^{2.5}$.1$^{7.10}$]-dodec-3-ene. The conversion of the monomers into the ring-opened copolymer was 99%, and the hydrogenation rate of Ring-Opened Copolymer HH was 99.8%.

The number average molecular weight (Mn) and weight average molecular weight (Mw) of Ring-Opened Copolymer HH were 21,000 and 69,000, respectively, and Mw/Mn was 3.3.

With respect to Ring-Opened Copolymer HH, a specimen was produced in the same manner as in Example 1 except that cyclohexane was used in place of tetrahydrofuran, to evaluate its respective physical properties. The results are shown in Table 1.

TABLE 1

|  | Total luminous transmittance (%) | Glass transition temperature (° C.) | Water absorption (%) | Peeling property (Count) | Tensile strength (MPa) | Elongation (%) |
| --- | --- | --- | --- | --- | --- | --- |
| Example 1 | 91 | 141 | 0.12 | 0 | 48 | 7.9 |
| Example 2 | 91 | 140 | 0.09 | 0 | 53 | 9.1 |
| Example 3 | 91 | 143 | 0.12 | 0 | 52 | 9.0 |
| Example 4 | 91 | 145 | 0.15 | 0 | 60 | 9.5 |
| Example 5 | 91 | 131 | 0.07 | 0 | 52 | 9.2 |
| Comparative Example 1 | 91 | 168 | 0.34 | 0 | 40 | 6.9 |
| Comparative Example 2 | 91 | 145 | 0.12 | 0 | 35 | 6.2 |
| Comparative Example 3 | 91 | 137 | 0.01 | 80 | 43 | 7.5 |

COMPARATIVE EXAMPLE 2

A ring-opened cycloolefin copolymer (the resultant ring-opened cycloolefin copolymer is referred to as "Ring-Opened Copolymer G") and a hydrogenated ring-opened cycloolefin copolymer (the resultant hydrogenated ring-opened cycloolefin copolymer is referred to as "Ring-Opened Copolymer GH") were prepared in the same manner as in Example 1 except that tricyclo[5.2.1.0$^{2.6}$]dec-8-ene, in which a molar ratio of an endo form to an exo form was 10:90, was used in place of tricyclo[5.2.1.0$^{2.6}$]dec-8-ene, in which a molar ratio of an endo form to an exo form was 95:5. The conversion of the monomers into the ring-opened copolymer was 98%, and the hydrogenation rate of Ring-Opened Copolymer GH was 99.8%.

The number average molecular weight (Mn) and weight average molecular weight (Mw) of Ring-Opened Copolymer GH were 75,000 and 165,000, respectively, and Mw/Mn was 2.2.

With respect to Ring-Opened Copolymer GH, a specimen was produced in the same manner as in Example 1 to evaluate its respective physical properties. The results are shown in Table 1.

COMPARATIVE EXAMPLE 3

A ring-opened cycloolefin copolymer (the resultant ring-opened cycloolefin copolymer is referred to as "Ring-Opened Copolymer H") and a hydrogenated ring-opened cycloolefin copolymer (the resultant hydrogenated ring-opened cycloolefin copolymer is referred to as "Ring-Opened Copolymer HH") were prepared in the same manner as in Example 1 except that 8-ethyltetracyclo[4.4.0.1$^{2.5}$.1$^{7.10}$]dodec-3-ene was used in place of 8-methyl- As apparent from Table 1, it was confirmed that the ring-opened cycloolefin copolymers (Ring-Opened Copolymers AH to EH) according to Examples 1 to 5 were high in total luminous transmittance, high in glass transition temperature, low in water absorption, high in adhesive property to the metal and high in mechanical strength.

On the other hand, the ring-opened cycloolefin copolymer (Ring-Opened Copolymer FH) according to Comparative Example 1 was high in water absorption and low in strength compared with the ring-opened copolymers according to Examples, the ring-opened cycloolefin copolymer (Ring-Opened Copolymer GH) according to Comparative Example 2 was low in strength compared with the Ring-Opened copolymers according to Examples, and the ring-opened cycloolefin copolymer (Ring-Opened Copolymer HH) according to Comparative Example 3 was low in adhesive property compared with the ring-opened copolymers according to Examples.

EFFECTS OF THE INVENTION

Since the ring-opened cycloolefin copolymers according to the present invention contain a structural unit derived from a specific tricyclomonoolefin, in which a proportion of an endo form is at least 80%, and a structural unit derived from a specific tetracyclododecene having an ester group, they are excellent in optical properties such as transparency, low in water (moisture) absorption property, high in affinity for other materials and good in post processing properties such as adhesive property and printability and moreover have excellent heat resistance and mechanical strength.

According to the production process of the present invention, the above-described ring-opened cycloolefin copolymers can be produced with advantage.

Since the ring-opened cycloolefin copolymers according to the present invention have such properties as described above, they are extremely useful as optical parts or optical materials such as coating materials of the optical parts. In addition, they are useful as electronic part materials such as semiconductor encapsulating materials, coating materials and adhesives, and besides medical instruments, various containers, binders and the like.

The invention claimed is:

1. A ring-opened cycloolefin copolymer which is a ring-opened cycloolefin copolymer or hydrogenated ring-opened cycloolefin copolymer comprising a structural unit (A) represented by the following general formula (1-1), the following general formula (1-2) or the following general formula (1-3) and a structural unit (B) represented by the following general formula (2) in a proportion of 10:90 to 70:30 in terms of a molar ratio, wherein a monomer for obtaining the structural unit (A) contains an endo form in a proportion of at least 80 mol % and the copolymer has a glass transition temperature of 120 to 250° C.:

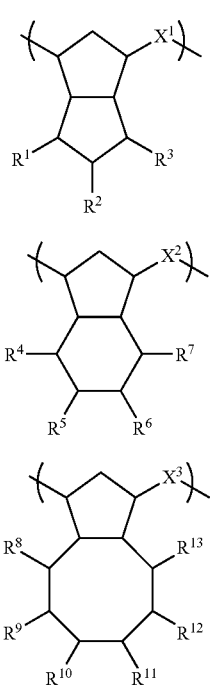

General formula (1-1)

General formula (1-2)

General formula (1-3)

wherein in the general formulae (1-1) to (1-3), $R^1$ to $R^{13}$ independently represent a group selected from a hydrogen atom, halogen atoms, and alkyl groups and halogenated alkyl groups having 1 to 4 carbon atoms, and $X^1$ to $X^3$ mean individually an ethylene group or vinylene group; and

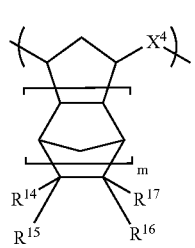

General formula (2)

wherein in the general formula (2), m is 1 or 2, $X^4$ means an ethylene group or vinylene group, and $R^{14}$ to $R^{17}$ independently represent a hydrogen atom, a halogen atom, an alkyl group having 1 to 20 carbon atoms, a cycloalkyl group, an aryl group, an alkenyl group, a halogenated hydrocarbon group, an alkylene group formed by bonding $R^{14}$ or $R^{15}$ to $R^{16}$ or $R^{17}$, a group represented by —$(CH_2)_k Z$ or a group formed by bonding $R^{14}$ or $R^{15}$ to $R^{16}$ or $R^{17}$ and represented by —$(CH_2)_k$—C(O)O—, with the proviso that at least one of $R^{14}$ to $R^{17}$ is a group represented by —$(CH_2)_k Z$ or a group represented by —$(CH_2)_k$—C(O)O—, in which k is an integer of 0 to 3, Z is a group represented by —C(O)O—$R^{18}$ or —OC(O)—$R^{19}$, and $R^{18}$ and $R^{19}$ represent individually a hydrocarbon group or halogenated hydrocarbon group having 1 to 10 carbon atoms.

2. The ring-opened cycloolefin copolymer according to claim 1, wherein a monomer for obtaining the structural unit (A) represented by the general formula (1-1), general formula (1-2) or general formula (1-3) is a tricyclomonoolefin compound represented by the following general formula (3-1), the following general formula (3-2) or the following general formula (3-3), and a proportion of an endo form in the tricyclomonoolefin compound is at least 80 mol %:

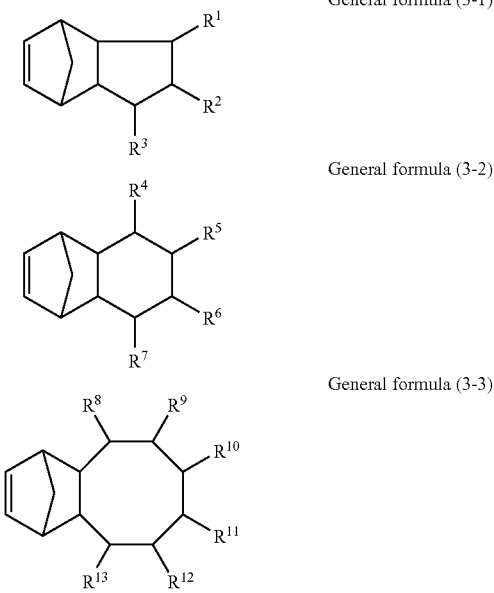

General formula (3-1)

General formula (3-2)

General formula (3-3)

wherein in the general formulae (3-1) to (3-3), $R^1$ to $R^{13}$ independently represent a group selected from a hydrogen atom, halogen atoms, and alkyl groups and halogenated alkyl groups having 1 to 4 carbon atoms.

3. The ring-opened cycloolefin copolymer according to claim 1 or 2, which comprises a structural unit (C) derived from a cycloolefin compound having a hydrolyzable silyl group or an oxetanyl group in its side chain in a proportion of 0.1 to 30 mol % based on the whole structural unit.

4. The ring-opened cycloolefin copolymer according to claim 3, which is crosslinked by the hydrolyzable silyl group or the oxetanyl group.

5. The ring-opened cycloolefin copolymer according to claim 1, wherein at least a part of the structural unit (A) is a structural unit derived from tricyclo[5.2.1.0$^{2,6}$]dec-8-ene.

6. A process for producing a ring-opened cycloolefin copolymer, which comprises the step of ring-opening polymerization of a monomer composition containing a monomer, which is composed of a tricyclomonoolefin compound represented by the general formula (3-1), the general formula (3-2) or the general formula (3-3) set forth in claim 2, and in which a proportion of an endo form in the tricyclomonoolefin compound is at least 80 mol %, and a monomer represented by the following general formula (4) in a proportion of 10:90 to 70:30 in terms of a molar ratio:

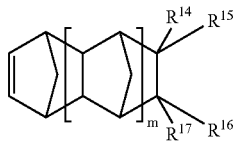

General formula (4)

wherein in the general formula (4), m is 1 or 2, and $R^{14}$ to $R^{17}$ independently represent a hydrogen atom, a halogen atom, an alkyl group having 1 to 20 carbon atoms, a cycloalkyl group, an aryl group, an alkenyl group, a halogenated hydrocarbon group, an alkylene group formed by bonding $R^{14}$ or $R^{15}$ to $R^{16}$ or $R^{17}$, a group represented by —$(CH_2)_k Z$ or a group formed by bonding $R^{14}$ or $R^{15}$ to $R^{16}$ or $R^{17}$ and represented by —$(CH_2)_k$—C(O)O—, with the proviso that at least one of $R^{14}$ to $R^{17}$ is a group represented by —$(CH_2)_k Z$ or a group represented by —$(CH_2)_k$—C(O)O—, in which k is an integer of 0 to 3, Z is a group represented by —C(O)O—$R^{18}$ or —OC(O)—$R^{19}$, and $R^{18}$ and $R^{19}$ represent individually a hydrocarbon group or halogenated hydrocarbon group having 1 to 10 carbon atoms.

7. The production process of the ring-opened cycloolefin copolymer according to claim 6, wherein the monomer composition is hydrogenated after the ring-opening copolymerization treatment.

8. An optical material comprising the ring-opened cycloolefin copolymer according to claim 1.

* * * * *